(12) United States Patent
Munter et al.

(10) Patent No.: US 7,545,804 B2
(45) Date of Patent: Jun. 9, 2009

(54) HIGH THROUGHPUT ROTATOR SWITCH HAVING EXCESS TANDEM BUFFERS

(75) Inventors: Ernst A. Munter, Kanata (CA); Delfin Y. Montuno, Kanata (CA); James Aweya, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 975 days.

(21) Appl. No.: 10/659,320

(22) Filed: Sep. 11, 2003

(65) Prior Publication Data

US 2005/0058127 A1 Mar. 17, 2005

(51) Int. Cl.
*H04L 12/54* (2006.01)
*H04L 12/56* (2006.01)

(52) U.S. Cl. .................. 370/360; 370/386; 370/419

(58) Field of Classification Search .............. 370/360, 370/380, 381, 386–389, 391, 392, 412–414, 370/419–420, 422, 429
See application file for complete search history.

(56) References Cited

U.S. PATENT DOCUMENTS

| | | | |
|---|---|---|---|
| 4,470,139 A | 9/1984 | Munter | 370/363 |
| 5,168,492 A | 12/1992 | Beshai et al. | 370/353 |
| 5,528,406 A * | 6/1996 | Jeffrey et al. | 398/55 |
| 6,486,983 B1 * | 11/2002 | Beshai et al. | 398/54 |
| 2002/0039362 A1 * | 4/2002 | Fisher et al. | 370/387 |
| 2003/0053417 A1 | 3/2003 | Munter et al. | 370/244 |
| 2003/0081548 A1 * | 5/2003 | Langevin et al. | 370/230 |
| 2004/0085979 A1 * | 5/2004 | Lee et al. | 370/412 |

OTHER PUBLICATIONS

Awadallah et al. "Analysis of a packet switch with memories running slower than the line-rate", IEEE INFOCOM'2000, vol. 2, pp. 529-537, Mar. 2000.*

* cited by examiner

*Primary Examiner*—Wing F Chan
*Assistant Examiner*—Saba Tsegaye
(74) *Attorney, Agent, or Firm*—Guerin & Rodriguez, LLP (57) ABSTRACT

A rotator switch including more tandem buffers than inputs is disclosed. An input data conditioner formats data to be transferred from the multiple inputs to the tandem buffers. Excess tandem buffers allow data to be transferred from inputs to tandem buffers at a rate less than the rate at which data arrives at the inputs. Excess capacity of the switch fabric may be used to carry overhead, or slow the rate at which data is transferred to the switch fabric.

25 Claims, 6 Drawing Sheets

HIGH THROUGHPUT ROTATOR SWITCH HAVING EXCESS TANDEM BUFFERS

FIELD OF THE INVENTION

The present invention relates generally to communication switches, and more specifically, to rotator switches capable of switching communications traffic at increased rates.

BACKGROUND OF THE INVENTION

In communication networks, information in the form of data is typically passed between endpoints. In order to achieve this, the data is often routed using one or more switches. Conventional switches may be used to establish circuits across the network or to route data units, typically formed as packets. Known circuit switches include space division switches, time multiplexed switches, S-T-S (space-time-space) switches; and T-S-T (time-space-time) switches. Known packet switches include asynchronous transfer mode (ATM) switches; internet protocol (IP) routers; and the like.

Both circuits and packets may be switched using a switch having buffers cyclically interconnected to inputs and outputs by way of commutators. Such switches are referred to as rotator switches. Example rotator switches are described in U.S. Pat. No. 4,470,139, entitled Switching Network For Use In a Time Division Network and U.S. Pat. No. 5,168,492, entitled Rotating-Access ATM-STM Packet Switch, the contents of both of which are incorporated herein by reference.

Conventional rotator switches transfer data at a plurality of inputs to tandem buffers each having multiple storage locations. At any time, each input and each output is interconnected with a single buffer. The interconnections of inputs to buffers, and outputs to buffers, are cycled synchronously so that each buffer is interconnected with each input and each output once in a rotator cycle. Data units may be routed from an input to an output, by associating a suitable destination address with each data unit. The destination address may be contained in a header associated with the data unit, or the switch may be configured to statically switch inputs to outputs. Data from any input may be transferred to a storage location within an interconnected tandem buffer, based on its destination. As each tandem buffer is interconnected to an output, a particular one of its locations may be unloaded at that output. For example, the $i^{th}$ storage location of a tandem buffer may be consistently unloaded at the $i^{th}$ output. Each output is associated with a specific storage location in each buffer. The storage location associated with any one output is typically the same for all buffers. Data at an input may quickly be transferred to a destination output by transferring the data to the tandem buffer currently interconnected with the input in the storage location associated with the destination output as indicated by the header, if this storage location is available. When this tandem buffer is next connected to the destined output, the output receives this data.

Now, so that data and associated headers can be switched without delay, and through the switch at the arrival rate, commutators are typically connected to tandem buffers at a rate equal to or in excess of the rate of arrival of data. This, of course, requires careful synchronization between the operation of the commutators and the arrival of data. Moreover, the faster a switch operates the more ancillary difficulties are encountered. For example, faster switches consume more power; require higher tolerance components; are more susceptible to interference; and are more susceptible to parasitic effects of components.

As input line rates have increased to the level of optical line rates, it has become increasingly difficult to manufacture electrical switches, and particularly rotator switches that are able to transfer and switch traffic at the higher rates.

Accordingly, it would be desirable to provide a rotator switch that may accommodate higher line rates, without requiring the switch to operate at significantly increased speeds.

SUMMARY OF THE INVENTION

In accordance with an aspect of the present invention, a rotator switch includes more tandem buffers than inputs. Excess tandem buffers allow data to be transferred from inputs to tandem buffers at a rate less than the rate at which data arrives at the inputs. Excess capacity of the switch fabric may be used to carry overhead, or slow the rate at which data is transferred to the switch fabric. As a result, overall switch fabric throughput is increased without increasing the rate at which traffic is transferred from inputs to the switch fabric.

In accordance with an aspect of the present invention, there is provided a communications switch, including p inputs and q outputs; a rotator switch including a (p+k)×(p+k) switch fabric; an input data conditioner for distributing data received at the p inputs to the switch fabric; an output data conditioner in communication with the switch fabric for distributing data received from the switch fabric to the q outputs.

In accordance with another aspect of the present invention, a communications switch for switching information units between inputs and outputs, includes: p inputs each for receiving data to be switched to q outputs; p+k information storage buffers, each of the information storage buffers comprising p+k storage locations; means for distributing data received at the p inputs to p+k intermediate inputs; means for cyclically interconnecting each of the p+k intermediate inputs to one of the p+k information storage buffers; means for distributing data from the p+k information storage buffers to the q outputs; means for cyclically interconnecting each of the p+k information storage buffers to the means for distributing data from the p+k information storage buffers.

In accordance with yet another aspect of the present invention, a communications switch for switching data between inputs and outputs, includes: p inputs each for receiving data to be switched to q outputs; p+k information storage buffers, each of the information storage buffers comprising p+k storage locations; an input data conditioner, comprising p inputs and p+k outputs, connected between the p inputs of the communications switch and the p+k information buffers, for distributing data received at the p inputs of the input data conditioner to its p+k outputs; an ingress commutator for interconnecting each of the p+k information storage buffers to one of the p+k outputs of the input data conditioner; an output data conditioner comprising p+k inputs and q outputs, for distributing data from its p+k inputs to its q outputs; an egress commutator for interconnecting each of the p+k information storage buffers to one of the p+k inputs of the output conditioner. The ingress commutator is operable to cyclically interconnect each of the p+k inputs of the input data conditioner to each of the p+k information buffers to provide data from the each of the p+k inputs of the input data conditioner to the p+k information storage buffers. The egress commutator is operable to cyclically interconnect each of the p+k information storage buffers to the p+k inputs of the output data conditioner to provide data from the p inputs to the q outputs.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of this invention.

DETAILED DESCRIPTION

Figure 1:
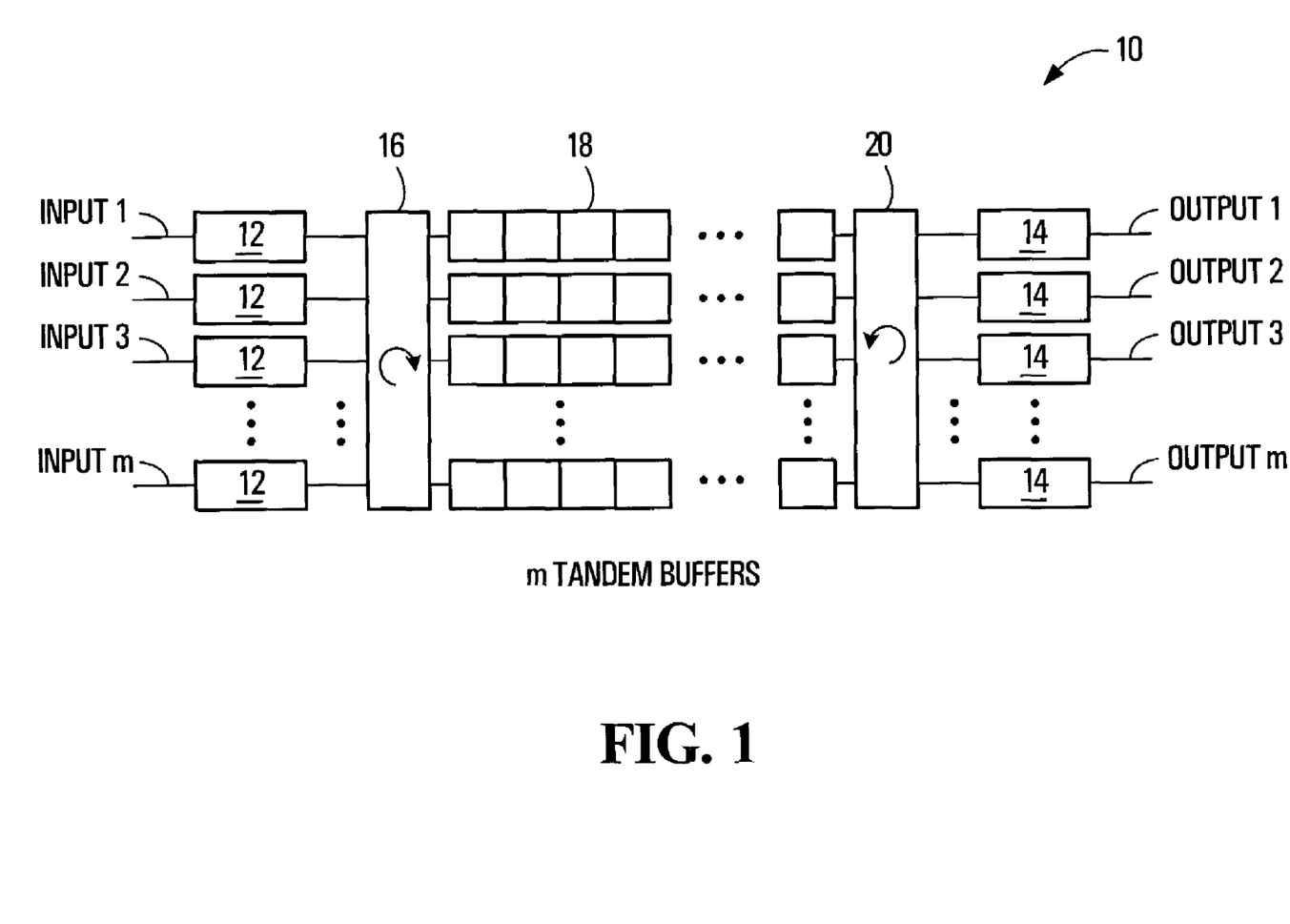
FIG. 1 is a simplified schematic diagram of a conventional rotator switch.

FIG. 1 schematically illustrates a conventional rotator switch 10. Rotator switches are described in grater detail in U.S. Pat. No. 7,814,431, the contents of which is hereby incorporated by reference, and the two above referenced U.S. patents.

Switch 10 may switch data from a plurality of m input buffers 12 to a plurality of m output buffers 14. Switch 10 includes, in flow communication, input buffers 12; ingress commutator 16; a plurality of m tandem buffers 18; egress commutator 20; and output buffers 14.

Suitably adapted, a switch like switch 10 may act as an internet protocol (IP) router; an asynchronous transfer mode (ATM) switch; a time-division multiplexed circuit switch, or a combined packet/circuit switch. Depending on the particular nature of switch 10, switch 10 may be used to switch data in timeslots; packets; ATM cells, or the like.

Input buffers 12 and output buffers 14 are first-in, first-out store and forward buffers, each in communication with a data link, such as an optical telecommunications fiber; a telephony trunk; or the like, by way of a suitable data formatting circuit. Each data formatting circuit (not shown) receives data from the data link in its native format and converts it to a format suitable for switching through switch 10. For example, if switch 10 is adapted to switch ATM cells, the data formatting circuits may encapsulate received ATM cells. If switch 10 switches time division multiplexed telephony data, the data formatting circuits may combine one or more TDM octets of TDM data, and encapsulate these. The number of octets encapsulated together will depend on the granularity of switch 10. A complementary data formatting circuit (not shown) is associated with each output buffer 14 and may de-encapsulate the encapsulated data.

Formation of switch 10 is detailed in U.S. Pat. No. 7,814,431. As further detailed in this U.S. Patent, ingress commutator 16 has m inputs and m outputs, and may be best described as an m-sate interconnect. In each of its m states, each of the m inputs is connected to one of the m outputs. Although each input may be connected to any output, all me sequential inputs are presented at me sequential outputs, in the order of the inputs. The state of the commutator 16 controls the offset between inputs and outputs. Egress commutator 20 is formed in much the same way as ingress commutator 16, and acts as an m state interconnect having m inputs and m outputs. As such, ingress and egress commutators 16 and 20 function to cyclically interconnect t each tandem buffer 18 to each input buffer 12 and each output buffer 14. Cyclic operation of commutators 16 and 20 allow data at a particular input buffer 1 to be loaded into a tandem buffer 18, and thereafter unloaded at a destination output buffer 14.

Now, in any interconnection cycle, switch 10 is capable of loading one information unit into each of tandem buffers 18. Each information unit, however, corresponds to data arriving at an input buffer 12 and possibly associated overhead. Accordingly, in order to transfer data from input buffers 12 into tandem buffers 18 at a rate equal to or exceeding the arrival rate of data at buffers 12, information units are typically transferred from buffers 12 to tandem buffers 18 at a rate in excess of the arrival rate of data at input buffers 12. This can be accomplished by adjusting the clock rate of ingress commutator 16. As egress commutator 20 operates in synchronism with ingress commutator 16, it similarly typically operates at a rate that accounts for overhead. For high capacity switches, however, designing and constructing commutators 16 and 20 and tandem buffers 18 that are able to transfer data at a rate equal to or in excess of the line rate of arriving traffic may be quite difficult. In TDM switches the higher rate is typically due to overhead being added in a formatting circuit (not shown). The rate into the buffer 12 may be the same as the rate into the ingress commutator 16. As a result of the overhead accommodation then, the rate into the buffer 12 is already higher than the "line rate" at the input of the formatting circuit (not shown). In packet switches (statistical arrivals), a higher rate is commonly used to reduce or avoid congestion.

U.S. Pat. No. 7,814,431 further discloses a rotator switch including more tandem buffers than inputs or outputs. As disclosed, these extra tandem buffers may be used as redundant buffers that may be used to switch traffic through the switch in the event of a failure.

Figure 2:
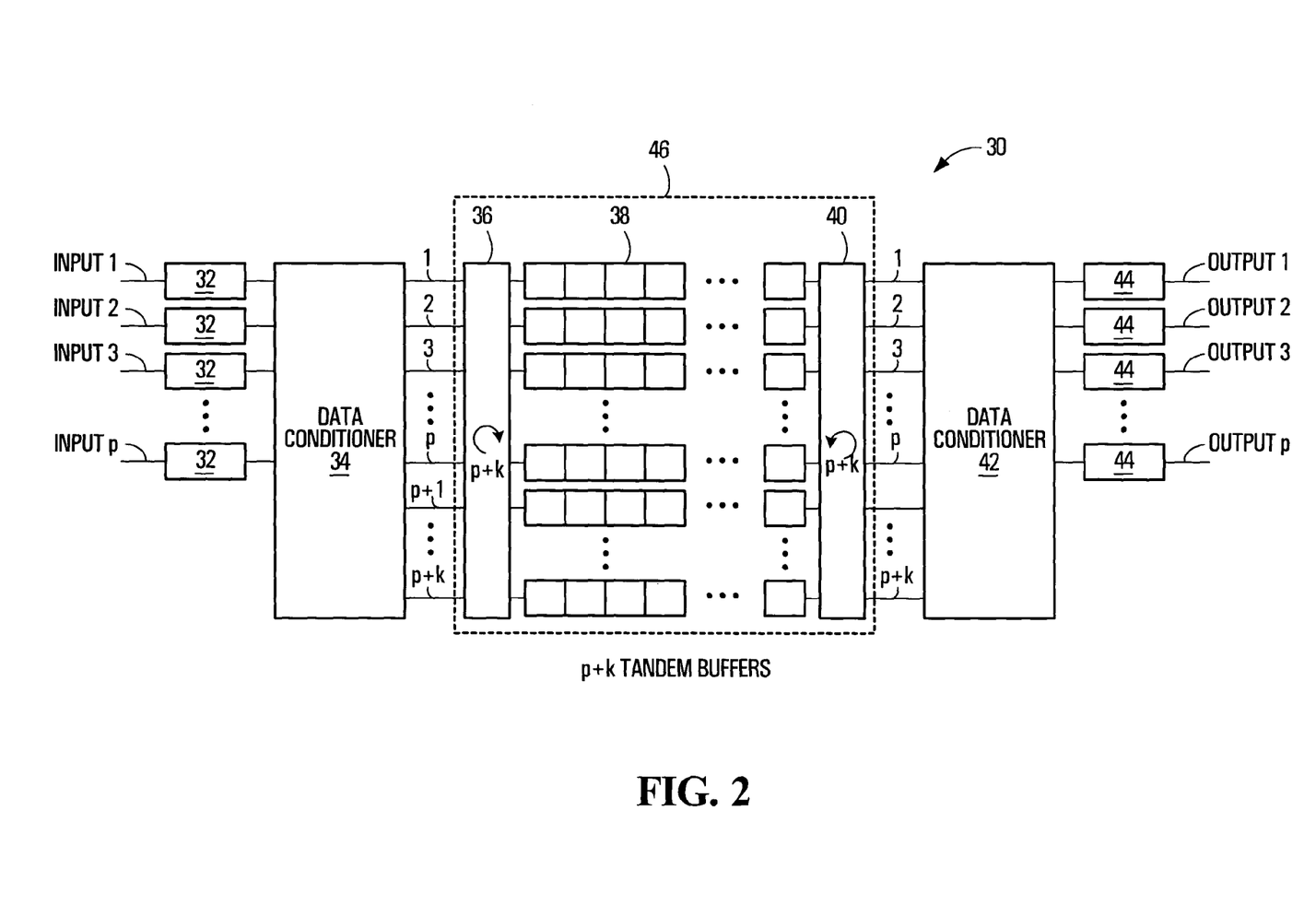
FIG. 2 is a simplified schematic diagram of a rotator switch, exemplary of an embodiment of the present invention.

FIG. 2 illustrates a rotator switch 20 exemplary of an embodiment of the present invention. Like the switch disclosed in U.S. Pat. No. 7,814,431, switch 30 includes more tandem buffers 38 than inputs. As will become apparent, however, these excess tandem buffers are used to provide capacity allowing switch 30 to switch incoming data at its inputs, and overhead, typically in the form of headers. Conveniently, as will become apparent, switch 30 does not require that data is transferred to and from each of the tandem buffers 38 at a rate in excess of the line rate. Instead, the increased numbers (and therefore capacity) of tandem buffers 38 and commutators 36 and 40 allow more data to be transferred per cycle of commutators 36 and 40, thereby increasing overall throughput of switch 30.

As illustrated in FIG. 2 example rotator switch 30 includes p input buffers 32; an input data conditioner 34; a p+k state (p+k)×(p+k) ingress commutator 36; p+k tandem buffers 38; a (p+k)×(p+k) egress commutator 40; an output data conditioner 42; and p output buffers 44. Ingress commutator 36; p+k tandem buffers 38; a (p+k)×(p+k) egress commutator 40 form a (p+k)×(p+k) switch fabric 46.

The relationship between inputs and outputs of exemplary switch 30 is stored within a connection memory (not shown) at switch 30. From the input/output point of view, enhanced rotator switch 30 looks like a conventional p×p rotator switch, but has additional data conditioners 34 and 42 that also contain connection memories needed to provide the input/output relationship. This embodiment will be apparent in the later discussion.

Traffic to be switched through switch 30 arrives at the p input buffers 32. The traffic may be in the form of streams of TDM data; ATM cells or the like. Each of these p input buffers 32 is a first-in, first-out data buffer, and thereby queues arriving data. Data is transferred from the p input buffers 32 to p inputs of input data conditioner 34.

Data conditioner 34 optionally adds header information to the data from its p inputs. Example headers each include an output destination address OUT, a tandem buffer destination address BUF, and a sequence number SEQ that may range between 1 to 2(p+k). The input data conditioner receives p+k entities of input data at each of its inputs (a total of (p+k)*p entities), over a time interval T of p*t seconds. It sends p entities of the $i^{th}$ input data to its $i^{th}$ output during the time interval T, for 1<=i<=p. During the same time interval T, the remaining p*k entities of the input data are sent (distributed on a cyclical basis) to the $j^{th}$ outputs of input data conditioner for p+1<=j<=p+k. Therefore, the input data conditioner distributes the p input data entities and their associated overheads to the p+k outputs, providing an intermediate input to switch fabric 46. Data presented at the outputs of input data conditioner 34 is presented in blocks. Each block can be thought of as an information unit that is switched through switch fabric 46.

Ingress commutator 36 cyclically interconnects the p+k outputs of data conditioner 34 to p+k tandem buffers 38. Interconnections of commutators 36 and 40 are commuted cyclically with each interconnection lasting a time interval of t seconds. One information unit is presented by data conditioner 34 at each time interval t at each input of ingress commutator 36. In any given time interval of t seconds, each single one of the p+k outputs presents less payload traffic than is arriving at one of the inputs to switch 30 in that same time interval. As will become apparent, the data accumulated every p*t seconds include two parts. A first part, comprising of p*p entities, which is transferred by the ingress commutator 36 to the tandem buffers through the $1^{st}$ to $p^{th}$ outputs of the ingress commutator 36. The second part comprising of p*k entities will be transferred by the ingress commutator 36 to the tandem buffers through the $(p+1)^{st}$ to $(p+k)^{th}$ outputs of the ingress commutator 36, balancing the input rate from input buffers 32 and the output rate from data conditioner 34 to the ingress commutator 36.

Egress commutator 40 similarly interconnects the tandem buffers 38 to the p+k inputs of output data conditioner 42. Ingress commutator 36, tandem buffers 38 and egress commutator 40 define the switch fabric 46 of a conventional (p+k)×(p+k) rotator switch, as illustrated in FIG. 1 with m=p+k. Switch fabric 46 feeds data to inputs of an output data conditioner 42. These inputs may be viewed as an intermediate output for switch 30. More significantly, output data conditioner 42 combines data from the p+k tandem buffers 38 to form q outputs, provided at its outputs to output buffers 44. In the illustrated embodiment, q=p. However, as will be appreciated, data could be switched to p of q available outputs (i.e. q>p).

More specifically, information units contained in the $i^{th}$ storage location of any tandem buffer 38 is also destined to the $i^{th}$ output buffer 44 for 1<=i<=p. As will become apparent, for data in the $p+1^{st}$ to $p+k^{th}$ location of buffers 38 (i.e p+1<=i<=p+k) the output destination address contained and the buffer destination address BUF in the associated header are used to direct the data to the destined one of the outputs 44. In this way, switch fabric 36 may be entirely conventional: the storage location of an information unit provided to any tandem buffer is controlled by a destination address BUF in the header. For tandem buffers 1<=i<=p, the value of BUF=the output destination of the information unit (i.e. OUT). For p+1<=i<=p+k, BUF=i. In order to ensure data in the information units sent to outputs 44 retains its sequence, the sequence number (SEQ) in the information unit header is used to reorder the data accordingly. As the number of tandem buffers 38 exceeds the number of input buffers 32, excess tandem buffers may be used to either transport overhead, or to effectively speed up the slow operation of transfer from and to each of tandem buffers 38, without reducing the overall throughput of switch 30. Since the rate of input to output data conditioner 42 and the rate of output from input data conditioner 34 match, so do the data rates of input buffers 32 and output buffers 44.

As should be apparent, the overall capacity of switch 30 is governed by the number of inputs p, the number of excess tandem buffers k, and the speed of interconnection of the tandem buffers. In any interconnection time interval t, an information unit composed of input data, having d data elements and internal transport overhead h, is transferred to each tandem buffer. In the same time interval t, $d_i$ elements of data may arrive at each input.

Switch 30 needs to switch data at each input with an incoming rate of $r_i = d_i/t$. Data is switched into fabric 46 into each tandem buffer 38 at a slower switching rate (d+h)/t, that is $d_i > d$.

The number of tandem buffers 38 required to achieve this may be calculated as follows:

let $b = \text{ceil}(d/(d_i - d))$ [the number of 't' rounds before an extra d amount of data has to be transferred];

Then, for p=b, only k=1 extra channel is sufficient to fully transfer the input data without loss or overflow condition. For p>b, k=ceil(p/b) extra tandem buffers are needed.

Figure 3A:
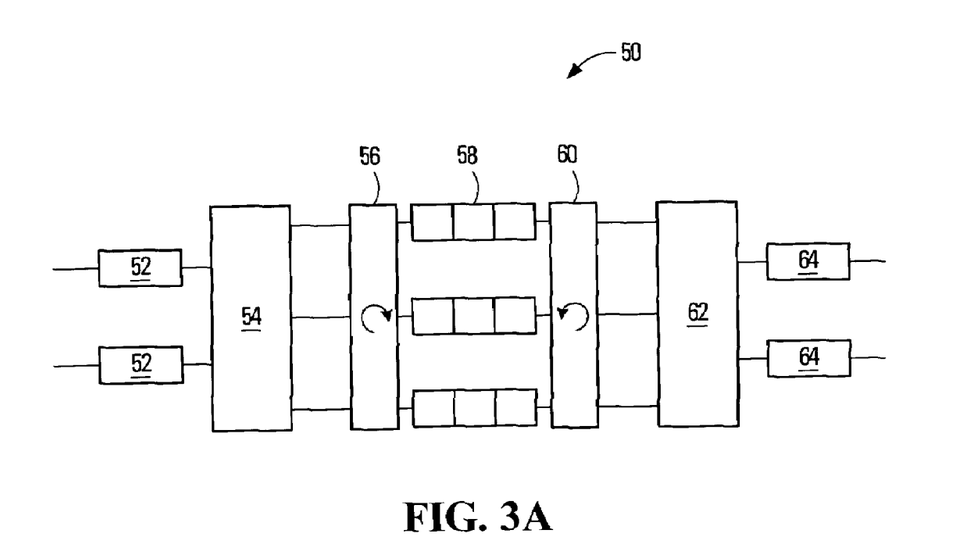
FIG. 3A is a simplified schematic diagram of a rotator switch, exemplary of an embodiment of the present invention.

Before generalizing, FIG. 3A illustrates a rotator switch 50 of the form of switch 30, but having only two inputs and two outputs, interconnected with input buffers 52 and output buffers 64, respectively. Switch 50 further includes three tandem buffers 58, each having three buffer locations. Data conditioner 54 distributes data at its two (2) inputs to its three (3) outputs and to tandem buffers 58. Data conditioner 62 similarly re-combines data from three tandem buffers 58 and presents the data at the two output buffers 64.

Figure 3B:
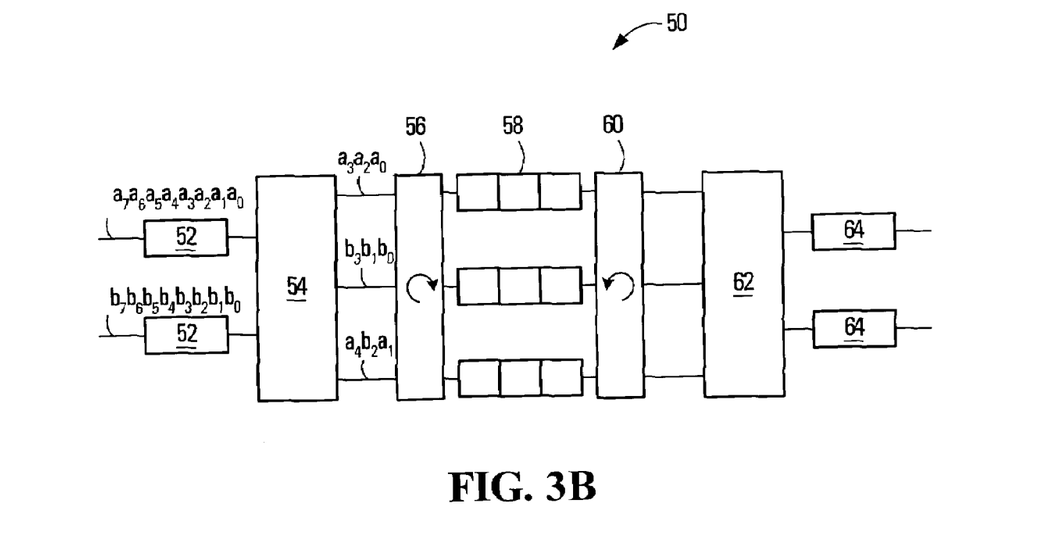
FIGS. 3B and 3C are a simplified schematic diagram of the rotator switch of FIG. 3A, in operation

FIG. 3B illustrates the operation of switch 50 to transport data, ignoring overhead. As illustrated, data elements $a_0$, $a_1$, $a_2$, $a_3$, $a_4$, $a_5$, $a_6$, $a_7$ and $b_0$, $b_1$, $b_2$, $b_3$, $b_4$, $b_5$, $b_6$ and $b_7$ from input buffers 52 are distributed to buffers 58 by data conditioner 54 and ingress commutator 56. The ratio of the input rate at anyone of the input buffers 52 to the output rate at anyone of the outputs of data conditioner 54 is 3:2. For this case, b=ceil(2/(3−2))=2. Therefore, only one extra tandem buffer 38 is required as p=b. Storage locations of tandem buffers 58 are illustrated to hold three data elements. Transfer from buffers 52 to buffers 58, is thus effected three data elements at a time. Now, with two inputs and three tandem buffers three data units from each input are placed within tandem buffers 58, in each ⅔ of a connection cycle of commutator 56, as depicted in FIG. 3B. As a result, commutator 56 may operate to transfer to buffers 58 at ⅔ the data rate at inputs to input buffers 52.

Figure 3C:
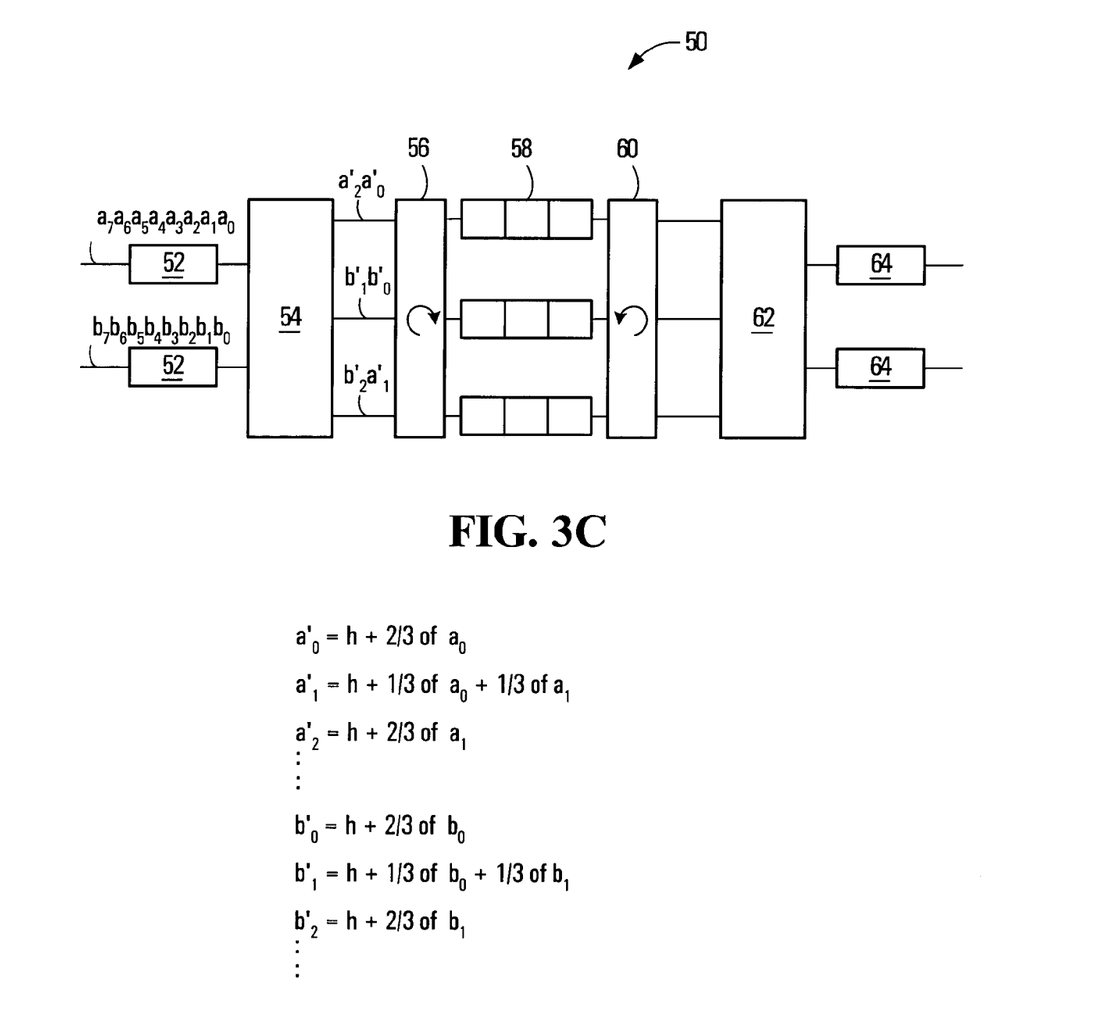

Alternatively as illustrated in FIG. 3C, switch 50 may be adapted to transport overhead occupying up to ⅓ of the payload being switched even if the input rate at anyone of the input buffers 52 is equal to the output rate at anyone of the outputs of data conditioner 54. FIG. 3C illustrates the distribution of data elements from inputs a and b. In this case, $a'_0 = h + \frac{2}{3}$ of $a_0$; $a'_1 = h + \frac{1}{3}$ of $a_0 + \frac{1}{3}$ of $a_1$; $a'_2 = h + \frac{2}{3}$ of $a_2$ ... and $b'_0 = h + \frac{2}{3}$ of $b_0$; $b'_1 = h + \frac{1}{3}$ of $b_0 + \frac{1}{3}$ of $b_1$; $b'_2 = h + \frac{2}{3}$ of $b_2$ ..., where h is the overhead occupying up to ⅓ of the information unit being switched. In each ⅔ interconnection cycle of commutator 56, two data elements are transferred from each input buffer. Thus, the transfer rate from buffers 52 to tandem buffers 58 need not be increased in order to account for overhead. In practice, as will become apparent with reference to exemplified embodiments, switch 30 (FIG. 2) is operated to transport some additional overhead, while at the same time transferring data into and from each of the buffers 38 at less than the line rate of the incoming data or at a rate equal to the line rate before header overhead is added.

Figure 4:
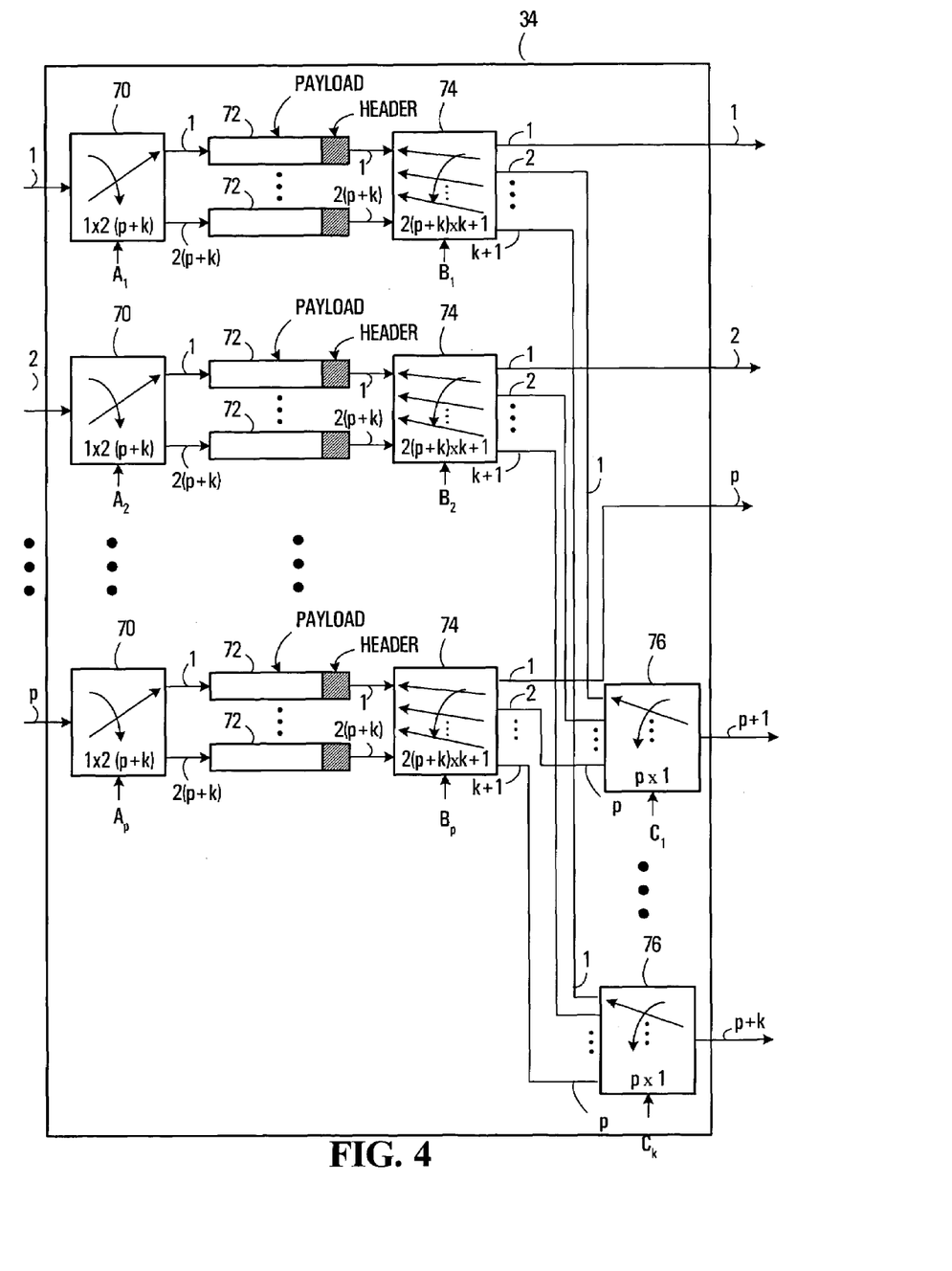
FIG. 4 is a simplified schematic diagram of an input data conditioner of the rotator switch of FIG. 2.

For clarity of explanation, FIG. 4 illustrates a generalized input conditioner 34 of the example rotator switch 30 of FIG. 2. As illustrated, each of the p input buffers of switch 30 is interconnected with a single input, 2(p+k) output (i.e. 1×2(p+k)) distributor 70. The 2(p+k) outputs of each distributor 70 are each interconnected to a buffer 72 capable of storing at least a fraction of the data arriving at an input buffer 32 (FIG. 2) during a commutator interconnection interval (t).

Specifically, each buffer 72 is capable of storing at least d+h data entities, the amount of data that can be switched in an interval time t, where d is the payload portion of the input data and h is the overhead. In this context, each data entity may be considered a byte, a word, a number bits, or any other unit of data. During this same interval t, $d_i$ data entities arrive at each input buffer 32 where $d_i$>d. As noted, an appropriate value of k may be determined as k=ceil(p/b), where b=ceil(d/($d_i$−d)).

The 2(p+k) buffers 72 associated with an input, are in turn interconnected with a 2(p+k) input, k+1 output (2(p+k)×(k+1)) data selectors 74. The first one output of each data selector 74 is interconnected to one of p outputs of input data conditioner 34. Each of the remaining k outputs of each of data selectors 74 is interconnected with one of k, p input and 1 output (p×1) data selectors 76.

The state of distributor 70, data selectors 74 and data selectors 76 controls the interconnections of inputs to outputs. These states are each controlled through an addressing circuit. Each addressing circuit may, for example, be formed by a ROM memory (not shown) mapping sequential states of each distributor 70 and data selectors 74 and data selectors 76. In FIG. 4 address inputs to distributor 70, selectors 74 and selectors 76 are depicted as address inputs A, B and C, respectively.

Each of the input distributors 70 has 2(p+k) states; each data selector 74 has 2p states and each data selector 76 has p states. Now, each input distributor 70 is clocked at a rate equal to 1/t', while each selector 74 and selector 76 are clocked in synchronism at a rate 1/t, with t'<t and more specifically t'=(p*t/(p+k)). At each change in state of distributor 70, a data corresponding to d amount of the data arriving at any input buffer is transferred from input buffer 32 to an intermediate buffer 72. So, after 2(p+k) time intervals t' (or a cycle of 2p time intervals t) of a data distributor 70, 2(p+k)d units of data arriving at each buffer 32 are transferred from each input to the multiple buffers 72 associated with that input.

Now, in each interconnection cycle of selectors 74, 2(p+k) data units including optional headers are transferred from intermediate buffers 72 to outputs of data conditioner 34. In order to ensure no data accumulates in the data conditioner 34, data selectors 74 change state at least every t seconds. As a result, all 2(p+k) intermediate buffers 72 are emptied in a period of 2p*t. Therefore in 2(p+k)*t', 2(p+k)d data entities are transferred into intermediate buffers 72; in the same time interval 2p*t, the same amount of data is transferred out of the input data conditioner 34.

As noted, in the exemplified embodiment, a small header h is preferably added to a fraction of data unit at each buffer 72 within data conditioner 34. The header preferably includes at least egress commutator output address OUT, destination output address BUF, and sequence number SEQ to assist in passing the data unit through switch 30. The egress commutator output address OUT identifies which of the p+k outputs of egress commutator 40 a transported data unit within buffer 38 (FIG. 2) is destined. The destination output address BUF identifies the destination output buffer 44. The sequence number SEQ identifies the relative order in which the input data stream is segmented and stored in the buffers 72 and is used for reordering purposes at the output data conditioner 42. A simple repeating numbering scheme such as 1 to 2(p+k) can be used for indicating the sequence.

In a conventional rotator switch a destination address OUT directs an information unit to the proper buffer location within a tandem buffer (e.g. buffer 18 of switch 10 of FIG. 1). The buffer location maps one-to-one into a unique output buffer location 14, FIG. 1. In the exemplary rotator switch 30 having excess tandem buffers, the p+1 to p+k buffers within a tandem buffer 38, FIG. 2 do not have an implicit output buffer 44 location mapping. Nevertheless, to direct the information unit in these buffer locations, switch 80 in output conditioner 42 is provided. This switch 80 can either use additional info such as the ultimate destination output address OUT in the header to switch information units or cyclically distribute the k inputs to the p switches 82. In the latter case, no additional header info is needed and the setting of the k switches 80 can be determined and fixed, once the input/output connections are determined. Optionally, BUF may be used to determine which of the p+k tandem buffers are used to transport data switched by switch 80. Specifically, BUF may be used by switch 80 to its input to one of its p outputs to deliver its input to the one of the 2 to k+1 inputs associated with the destination output address.

Control signals emanating from addressing circuits A, B and C are illustrated as signals $A_1, A_2, \ldots A_p, B_1, B_2 \ldots B_p$, and $C_1, C_2 \ldots C_k$ reflecting address signals for the p distributors 70; p selectors 74; and k selectors 76. Addressing circuits A, B and C may be formed in a convention manner, using for example, data lines of one or more memory elements, counters or the like. Example addressing circuits formed using read only memories and counters are detailed in U.S. patent application Ser. No. 09/954,192.

Addressing circuit A simply ensures that all 2(p+k) buffers are sequentially provided data, one payload buffer 72 worth of data from each input at each t' seconds. The following sets out an example interconnection cycle for the $i^{th}$ input distributor 70:

| Time (t') | $A_i$ In → out |
|---|---|
| 1 | 1 → 1 |
| 2 | 1 → 2 |
| . | . |
| . | . |
| . | . |
| i | 1 → i |
| . | . |
| . | . |
| . | . |
| 2(p + k) − 1 | 1 → 2(p + k) − 1 |
| 2(p + k) | 1 → 2(p + k) |

Addressing circuit B ensures that the data transferred from intermediate buffers 72 is properly distributed, so that the p+k outputs of the data conditioner 34 are connected to the outputs of all selectors 74 in a fair manner. More specifically, selected data at outputs 2 to (k+1) of each selector 74 is provided to k p×1 selectors 76 with one output going to one of the k p×1 selectors 76. That is, in each 2p*t time interval, each selector 74 presents its k outputs twice to the k, p×1 selectors 76 to become the p+1 to p+k outputs of the conditioner 34. During this same time 2p*t interval the output 1 of each of the selector 74 is directly connected to one of 1 to p outputs of the conditioner 34.

For the p data selectors 74, the interconnection for each interval in an interconnection cycle may generally be summarized as follows:

| Time (t) | $B_1$ In → out | ... $B_i$ In → out | ... $B_p$ In → out |
|---|---|---|---|
| 1 | p + k + 1 → 1<br>p + k + 2 → 2<br>.<br>.<br>.<br>p + 2k + 1 → k + 1 | ... p + k + 1 → 1 | ... p + k + 1 → 1 |
| 2 | p + 2k + 2 → 1<br>.<br>.<br>. | ... p + k + 2 → 1 | ... p + k + 2 → 1 |
| i | p + 2k + i → 1 | p + k + i → 1<br>p + k + i + 1 → 2<br>.<br>.<br>.<br>p + 2k + i → k + 1 | p + k + i → 1 |
| .<br>.<br>. | .<br>.<br>. | .<br>.<br>. | .<br>.<br>. |
| p | 2p + 2k → 1 | ... 2p + 2k → 1 | ... 2p + k → 1<br>2p + k + 1 → 2<br>.<br>.<br>.<br>2p + 2k → k + 1 |
| p + 1 | 1 → 1<br>2 → 2<br>.<br>.<br>.<br>k + 1 → k + 1 | . 1 → 1 | . 1 → 1 |
| p + 2 | k + 2 → 1 | 2 → 1 | 2 → 1 |
| .<br>.<br>. | .<br>.<br>. | .<br>.<br>. | .<br>.<br>. |
| p + i | i → 1 | i → 1<br>i + 1 → 2<br>.<br>.<br>.<br>k + i → k + 1 | i → 1 |
| .<br>.<br>. | .<br>.<br>. | .<br>.<br>. | .<br>.<br>. |
| 2p | p + k → 1 | ... p + k → 1 | ... p → p<br>p + 1 → 2<br>.<br>.<br>.<br>p + k → k + 1 |

Addressing of each of the k selectors 76 may be summarized as:

| Time (t) | In → out |
|---|---|
| 1 | 1 → 1 |
| 2 | 2 → 1 |
| . | . |
| . | . |
| . | . |
| p | p → 1 |

Figure 5:
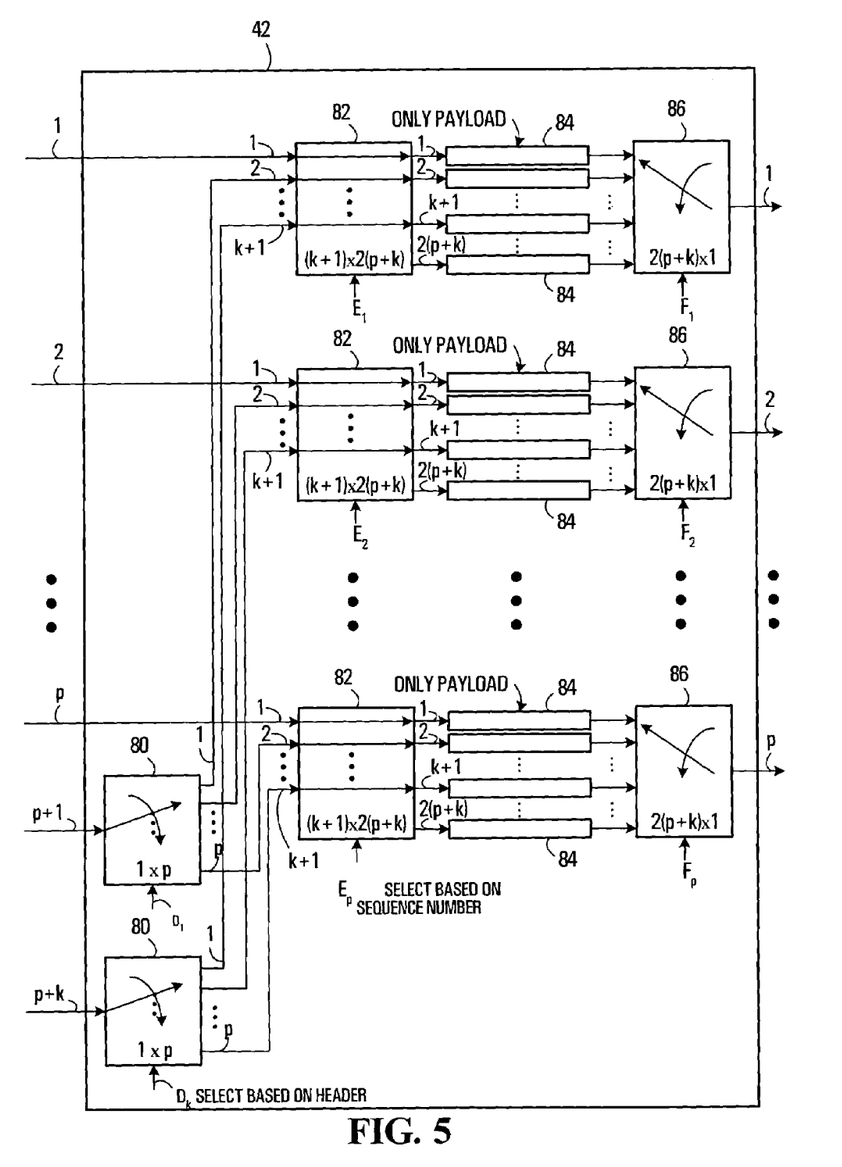
FIG. 5 is a simplified schematic diagram of an output data conditioner of the rotator switch of FIG. 2.

A complementary output data conditioner 42, interconnected to the p+k outputs of switch fabric 46 is illustrated in FIG. 5. As illustrated, output data conditioner 42, receives p+k inputs from egress commutator 40 (FIG. 2). It then distributes data at the p+k inputs to p outputs, in the opposite way as the input data conditioner 34 distributes data from its p inputs to its p+k outputs to the p+k inputs at ingress commutator 36 (FIG. 2).

As illustrated, output data conditioner 42 includes p, k+1 input, 2(p+k) output (i.e. k+1×2(p+k)) non-blocking switches 82. An input of each of these switches 82 is interconnected with an input to output data conditioner 42. The remaining k inputs are each interconnected with one output of the k, 1×p switches 80. Each output of each of the p switches 82 is connected with one intermediate buffer 84, in a set of 2(p+k) buffers 84 interconnected with each switch 82. Each buffer 84 may have the size of intermediate buffer 72, but need not accommodate overhead.

Each switch 80 interconnects each of its input to a selected one of its p outputs. The interconnect for each input to output of each switch 80 is controlled by the output destination address contained in the header in the data packet received at the input. In this way, data units at the inputs $p+1^{st}$ to $p+k^{th}$ inputs of data conditioner 42 are distributed to one of p destinations, based on header information within the data packet. That is, these k data units are not directly switched to their destinations by switch fabric 46; instead switch fabric 46 passes these data packets to switches 80, and switches 80 switch data within the packets to their desired destinations.

At switch 80, the output destination address within each packet is used to direct an incoming data to one of p switches 82. At each switch 82, the sequence number in each packet is used to switch the incoming data in that packet to a specified one of buffers 84 interconnected to that switch 82. In this way, switch 82 ensures proper order of switched data contained in transferred data units.

Interconnection of each of switches 80 is based on the output destination address in each packet [in the range from 1 to p]. That is, if the output destination address in the header associated with the incoming data is i, then it is switched to output i.

Interconnection of each of switches 82 is based on the sequence number [from 1 to 2(p+k)] in each packet. If the sequence number in the header associated with the incoming data is i, then it is switched to the $i^{th}$ buffer of 84.

Each of buffers 84 feed one input of p, 2(p+k) input, single output, data selectors 86. The output of each data selector 86 provides an output of output data conditioner 42.

Each switch 80 and each switch 82 is clocked at the rate of egress commutator 40 (i.e. once every t seconds). Data selectors 86 are clocked at the higher rate of 1/t'.

The state of each switch 82 is controlled by the sequence numbers of the k+1 packets at its input. The state of each of data selectors 86 is controlled through an addressing circuit operating in the opposite manner to those used for data distributors 70. In FIG. 5 address inputs to distributors 80, selectors 84 and selectors 86 are depicted as address inputs D, E and F, respectively.

As should now be appreciated, for any particular input to output interconnection of switch 30 (FIG. 2), the interconnection pattern of switches 80 and 82 and data selectors 86 is deterministic. Accordingly, the set of interconnections for each interconnection pattern for each of the p×p possibilities could be stored within addressing memories. In operation, data units are transferred from input buffers 32 to buffers 72 of data conditioner 34 (FIG. 4). At every time interval t', each data distributor 70 transfers d data units to a buffer 72. Each data selector 74 transfers the content of one buffer 72 every time interval t and the additional content of k buffers 72 at every p*t time intervals. Since there are p inputs and each one of them contributes additional k output at every p*t time intervals, the $p+1^{st}$ to $p+k^{th}$ outputs of data conditioner 34 will be presented with new data in each t second interval. Data distributors 70 are clocked at an interval of t' seconds; selectors 74 and 76 are clocked at intervals of t seconds as described above. Conditioner 34 thus distributes data from p inputs to p+k outputs every t seconds. New outputs are presented once every t seconds. These p+k outputs provide data to switch fabric 46.

Data is transferred from each of the p+k outputs (of the data conditioner 34) to the p+k tandem buffers 38 by commutator 36. Commutator 36 cyclically interconnects its p+k inputs to its p+k outputs. A complete cycle of commutator 36 takes at least (p+k)*t seconds. For the p+k outputs of conditioner 34, each output of commutator 36 is placed into the buffer corresponding to the destination of the data unit, based on the interconnection memory, i.e., egress commutator destination address.

Each of the $(p+1)^{st}$ to $(p+k)^{th}$ outputs of commutator 36 are placed into the corresponding $(p+1)^{st}$ to $(p+k)^{th}$ buffer location, respectively, of a then interconnected tandem buffer as if destined to p+1 to p+k 'outputs' by commutator. Therefore, the switch fabric does not have to be modified. As noted, traffic carried in the $(p+1)^{st}$ to $(p+k)^{th}$ buffer locations is not switched to its (final) destination output by switch fabric 46, but instead by switch 80, of output data conditioner 42.

At the same time, egress commutator 40 presents the $i^{th}$ memory location of a then interconnected tandem buffer 38 to the $i^{th}$ input of output data conditioner 42. As a result, at each cycle of commutators 36 and 40, egress commutator 40 unloads the $i^{th}$ buffer of the currently interconnected commutator to the $i^{th}$ input of output data conditioner 42.

Switches 82 (FIG. 5) are clocked in synchronism with selectors 76 and 74 (FIG. 4). Selectors 86 are clocked in synchronism with distributors 70, at a higher clock rate of 1/t'. Output data conditioner 42, in turn recombines the p+k inputs to p outputs, as described above. Headers added by input data conditioner 34, may be stripped by buffers 84. Switches 82 of output data conditioner 42 ensure that data units are properly re-ordered after passage through switch fabric 46. At every time interval t, the data coming to inputs 1 to p of the output data conditioner 42 are directed respectively to 1 to p switches 82 and based on the sequence number associated with each incoming data into a one of their respective buffers 84 preserving the order of the original data from the input. At the same time at every pt seconds, one of the switches 82 receives k incoming data from data selectors 80 according to the output destination address in the headers associated with the incoming data. As data destined to these data selectors 80 are sent in groups from the input data conditioner 34 and at the same time instant, they will be received at the same some future time instant at the output data conditioner 42. The sequence numbers associated with these data units are then used by respective destination switches 82 to place associated data in the proper order in the buffers 84. As noted, p+k buffers 84 will fill in pt seconds or equivalently (p+k)t' seconds. Thus when p+k buffers are filled, the data selector 86 can start to extract data from the buffers 84 at the rate of one payload per time interval t' without overrunning or underrunning of the buffers 84. When p+k data entities have been extracted, another p+k data entities will then be ready for subsequent extraction, guaranteeing continuous data flow at the input of the input data conditioner 34.

Conveniently, the transfer rate to and from each tandem buffer 38 is less than or equal to the arrival rate of data at each input of switch 30. As such, switch 30 is capable of switching traffic at high line rates without requiring significant increases in the transfer rate into tandem buffers 38, nor a significant increase in the rate of commutation of switch fabric 46.

As should now be appreciated, switch 30 is only exemplary of embodiments of the present invention, and is susceptible to numerous modifications. For instance, each data conditioner 34 and 42 could be formed in many ways. For example, the p (k input, 1 output) switches 76 (FIG. 4) could be replaced by a single (pk input, k output) switch. Switch 80 could be replaced by a complementary (k input, pk output) switch.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A communications switch for switching data between inputs and outputs, said communications switch comprising:
   p inputs each for receiving data to be switched to q outputs;
   p+k information storage buffers each of said information storage buffers comprising p+k storage locations;
   an input data conditioner, comprising p inputs and p+k outputs, connected between said p inputs of said communications switch and said p+k information buffers, for distributing data received at said p inputs of said input data conditioner to its p+k outputs;

an ingress commutator for interconnecting each of said p+k information storage buffers to one of said p+k outputs of said input data conditioner;

an output data conditioner comprising p+k inputs and q outputs, for distributing data from its p+k inputs to its q outputs;

an egress commutator for interconnecting each of said p+k information storage buffers to one of said p+k inputs of said output conditioner;

said ingress commutator operable to cyclically interconnect each of said p+k outputs of said input data conditioner to each of said p+k information buffers to provide data from said each of said p+k outputs of said input data conditioner to said p+k information storage buffers, said egress commutator operable to cyclically interconnect each of said p+k information storage buffers to said p+k inputs of said output data conditioner to provide data from said p inputs to said q outputs;

wherein p, q, and k are positive integers.

2. The switch of claim 1, where p=q.

3. The switch of claim 1, wherein said ingress commutator is clocked at a rate to transfer less data to each of said p+k information storage buffers during a time interval than is received at each of said p inputs during said time interval.

4. The switch of claim 1, wherein said ingress commutator is clocked at a rate of 1/t to transfer data to each of said information buffers arriving at said input at a rate of 1/t' where t'=t*p/(p+k).

5. The switch of claim 1, wherein said input data conditioner comprises 2p(p+k) buffers for storing data received at said p inputs of said data conditioner.

6. The switch of claim 5, wherein said input data conditioner comprises p, (1 input, 2(p+k) output) data distributors each to present data at one of said inputs of said input data conditioner to one of said buffers.

7. The switch of claim 6, wherein said input data conditioner comprises p, 2(p+k) input data selectors, each to select data from one of said buffers to one of p of said p+k outputs of said input data conditioner.

8. The switch of claim 7, wherein said input data conditioner comprises k, p input, one output data selectors, for selecting from one of its p inputs data to be output at one of k of said p+k outputs of said input data conditioner.

9. The switch of claim 1, wherein said output data conditioner comprises k one input, p output switches, each for switching data from its input to one of its p outputs.

10. The switch of claim 9, wherein said output data formatting block comprises p k+1 input, 2(p+k) output switches for ordering data units received at said p+k inputs of said output data formatting block.

11. The switch of claim 10, wherein said output data formatting block comprises p sets of 2(p+k) intermediate buffers, each in communication with one of said p output switches.

12. The switch of claim 11, wherein said output data formatting block comprises p 2(p+k) input, one output data distributors, each for providing an output from said data conditioner from one set of said intermediate buffers.

13. A communications switch, comprising:
p inputs and q outputs;
a rotator switch comprising a (p+k)×(p−K) switch fabric;
an input data conditioner for distributing data received at said p inputs to said switch fabric;
an output data conditioner in communication with said switch fabric for distributing data received from said switch fabric to said q outputs;
wherein p, q, and k are positive integers.

14. The communication switch of claim 13, wherein p=q.

15. The communications switch of claim 14, wherein said rotator switch comprises p+k information storage buffers and wherein said switch fabric is clocked at a rate so as to switch less traffic through each of said p+k information buffers than arrives at one of said inputs in a clock cycle.

16. The communications switch of claim 15, wherein said rotator switch comprises p+k information storage buffers and wherein said switch fabric is clocked at a rate so as to transfer an amount of traffic through said p+k information buffers equaling at least an amount arriving at all of said p inputs in said clock cycle.

17. A method of switching data between p inputs and q outputs, comprising:
distributing data from said p inputs to p+k intermediate inputs;
loading data from said p+k inputs into p+k tandem buffers, each of said tandem buffers comprising p+k storage locations;
unloading one location of each of said p+k tandem buffers at one of p+k intermediate outputs;
combining data from said p+k intermediate outputs to provide switched data from said p inputs at said q outputs;
wherein p, q, and k are positive integers.

18. The method of claim 17, further comprising cyclically interconnecting said p+k tandem buffers with said p+k intermediate inputs and said p+k intermediate outputs.

19. The method of claim 18, wherein data is loaded into said tandem buffers at a rate lower than a rate of traffic arriving at each of said p inputs.

20. The method of claim 19, wherein at least some of said data is transferred to a selected location of an interconnected tandem buffer, said location based on a destination for said at least some of said data.

21. The method of claim 19, further comprising combining data into data units, and including a header in each of said data units, each header including destination information and a sequence number for said each of said data units.

22. The method of claim 21, wherein said combining further comprises stripping said headers from said data units.

23. The method of claim 18, wherein said p+k tandem buffers are cyclically interconnected at a rate of 1/t to load data to each of said tandem buffers for data arriving at each of said inputs at a rate of 1/t', where t'=t*p/(p+k).

24. The method of claim 17 wherein data is loaded into all of said tandem buffers at a rate at least equal to a rate of arrival of data at all of said p inputs.

25. A communications switch for switching information units between inputs and outputs, said switch comprising:
p inputs each for receiving data to be switched to q outputs;
p+k information storage buffers, each of said information storage buffers comprising p+k storage locations;
means for distributing data received at said p inputs to p+k intermediate inputs;
means for cyclically interconnecting each of said p+k intermediate inputs to one of said p+k information storage buffers;
means for distributing data from said p+k information storage buffers to said p outputs;
means for cyclically interconnecting each of said p+k information storage buffers to said means for distributing data from said p+k information storage buffers;
wherein p, q, and k are positive integers.

* * * * *

UNITED STATES PATENT AND TRADEMARK OFFICE
CERTIFICATE OF CORRECTION

PATENT NO. : 7,545,804 B2
APPLICATION NO. : 10/659320
DATED : June 9, 2009
INVENTOR(S) : Ernst A. Munter, Delfin Y. Montuno and James Aweya It is certified that error appears in the above-identified patent and that said Letters Patent is hereby corrected as shown below:

In the specification, Column 3, line 61, "me" should read --m--.

In the specification, Column 3, line 62, "me" should read --m--.

In the specification, Column 4, line 1, delete the letter "t" after the word "interconnect".

In the specification, Column 4, line 4, "1" should read --12-- after the word "buffer".

In the specification, Column 4, line 36, "20" should read --30--.

In the claims, Claim 13, Column 13, line 63, "(p+k)x(p-K)" should read --(p+k)x(p+k)--.

Signed and Sealed this

Sixth Day of October, 2009

David J. Kappos
*Director of the United States Patent and Trademark Office*